United States Patent [19]

Gavranovic

[11] Patent Number: 4,750,557
[45] Date of Patent: Jun. 14, 1988

[54] WELL SCREEN

[75] Inventor: Lee Roy C. Gavranovic, Guy, Tex.

[73] Assignee: Well Improvement Specialists, Inc., Houston, Tex.

[21] Appl. No.: 938,225

[22] Filed: Dec. 5, 1986

[51] Int. Cl.$^4$ .................. E21B 43/04; E21B 43/08
[52] U.S. Cl. .................. 166/51; 166/157; 166/229
[58] Field of Search .............. 166/278, 51, 56, 157, 166/158, 205, 227, 229, 235, 386

[56] References Cited

U.S. PATENT DOCUMENTS

| 50,967 | 11/1865 | St. John. | |
|---|---|---|---|
| 58,953 | 10/1866 | Osgood. | |
| 83,901 | 11/1868 | Armstrong. | |
| 963,549 | 7/1910 | Harmon. | |
| 1,547,240 | 7/1925 | Steele | 166/229 |
| 1,974,664 | 1/1932 | Patten | 255/61 |
| 2,216,037 | 9/1940 | Layne | 166/1 |
| 2,321,318 | 6/1943 | Reistle, Jr. | 166/5 |
| 2,356,769 | 8/1944 | Layne | 166/26 |
| 2,513,944 | 7/1950 | Kessler | 166/1 |
| 3,362,475 | 1/1968 | Huitt et al. | 166/20 |
| 3,421,586 | 1/1969 | Solum | 166/205 |
| 4,474,239 | 10/1984 | Colomb et al. | 166/51 |
| 4,519,451 | 5/1985 | Gray et al. | 166/51 |
| 4,549,608 | 10/1985 | Stowe et al. | 166/280 |
| 4,550,778 | 11/1985 | Sullivan et al. | 166/234 |
| 4,552,215 | 11/1985 | Almond et al. | 166/278 |
| 4,552,216 | 11/1985 | Wilson | 166/261 |
| 4,553,595 | 11/1985 | Huang et al. | 166/278 |

OTHER PUBLICATIONS

Workover Well Control, Neal Adams, published by PennWell Books, pp. 4–11.
Lessons in Well Servicing and Workover (Lesson 1), published by Petroleum Extension Service, 1971, p. 23.
Halloburton Services Sales and Service Catalog, 1970–1971, pp. 130–136.
Casing Hardware and Hardware and Oilfiels Service Tools, pp. 14–16.
Baker Sand Control 1984–1985 Catalog, Section 3, N-Situ Techmology, pp. 24–53.

Primary Examiner—Stephen J. Novosad
Assistant Examiner—William P. Neuder
Attorney, Agent, or Firm—Vaden, Eickenroht, Thompson & Boulware

[57] ABSTRACT

A well screen device having body member, screen member attached to the body member, cup member attached to the body member for positioning the device in a fluid flow path, and channel member for conducting screened fluid from the screen. The device's cup member extends outwardly or is extensible outwardly from the device sufficiently to contact the interior surface of the flow path in which the device is emplaced to prevent the flow of unscreened fluid beyond the device. The body member can be solid or hollow with plugged ends. Spacer members can be used to mount the cup member to the body member and to provide a portion of the channel member for conducting the screened fluid past the cup member.

4 Claims, 2 Drawing Sheets

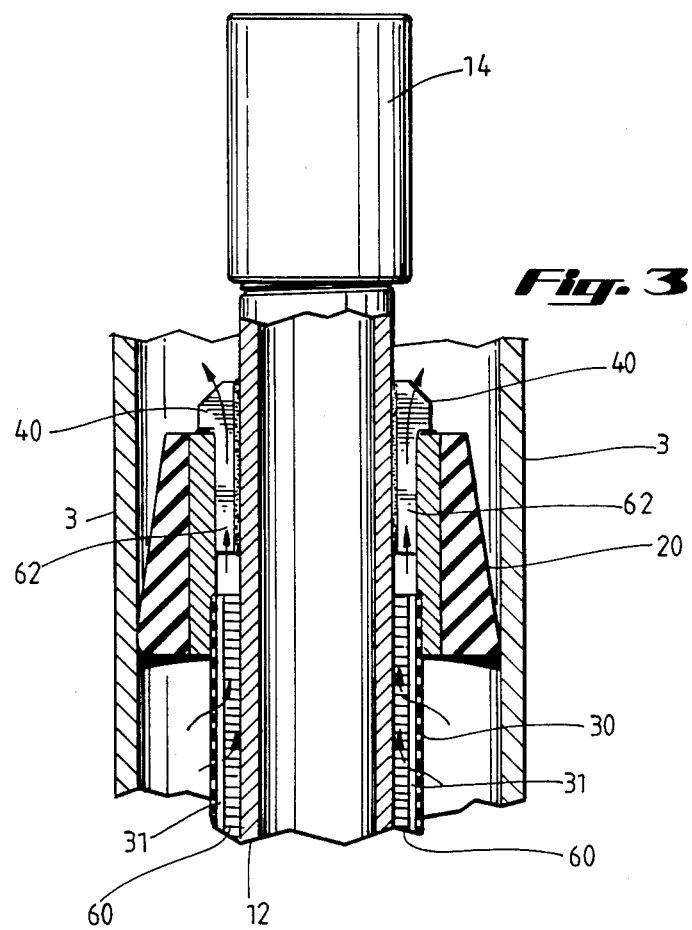
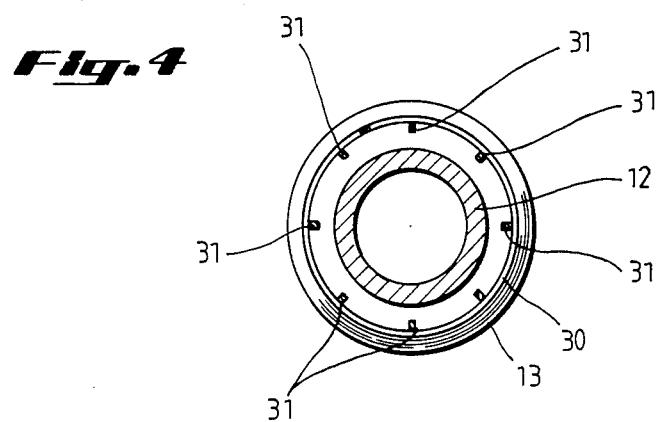

WELL SCREEN

BACKGROUND OF THE INVENTION

1. Field of the Invention

This invention relates to methods and apparatuses for the control of sand, formation particles, and other contaminants in a wellbore and particularly to devices and processes for protecting wellbore packers and other operative mechanisms from the deleterious effects of particulate contaminants.

2. Description of the Prior Art

Many attempts have been made to develop a method to keep sand out of a well, out of the fluids produced from a well and away from the various mechanisms in a producing wellbore. Where sand problems are common, control of sand is a necessity. Sand movement occurs in numerous types of geologic formations including the shallow formations of the Tertiary age and in depths above 12,000 feet. Sand infiltration is the primary cause for a major percentage of repairs necessary to maintain or improve production from wells. Formation sand causes the plugging of tubing, perforations, and devices within the well and erodes and damages wellhead and production equipment.

Conventional sand control methods include the pumping of fluids to the bottom of the wellbore. These fluids and their components can damage the formation and reduce production. Fluids such as drilling muds, completion or workover fluids, and reservoir fluids often contain solids which damage the formation or they contain chemicals which cause an injurious chemical reaction between the fluid and some component of the reservoir of formation.

Gravel packing is a conventional sand control technique. The two major types of gravel packing are conventional gravel packing and washdown gravel packing. In conventional gravel packing a working string is introduced into the wellbore with a gravel pack screen at the bottom of the string. A shorter screen called a "tattletale" is placed above the gravel packer screen. The gravel pack material is pumped down the working string to surround the screen and pack the annulus between string and wellbore in the area of the perforations which extend into the producing formation. Once the packing has reached a level above the tattletale, pumping is stopped. Prior to commencing production, the working string is removed from the wellbore and a production string is inserted. A packer is used to fill and close-off the space between the interior of the casing and the exterior of the production string so that produced fluids will flow up the production string rather than up the space between the casing and the production string.

In washdown gravel packing the wellbore is filled with a desired amount of gravel pack material, usually at least to a level above the perforations. The tubing string used to pump the packing is removed and a production string having a gravel pack screen at the bottom and a wash pipe therein is inserted into the packing. Water flowing down the wash pipe washes the gravel pack material out of the way to permit the screen and string to descend to the desired depth in the packing. This is necessary because the gravel pack material, due to its high coefficient of friction, presents a relatively "hard" surface to the screen. the wash pipe must be removed prior to the introduction of a production string. Again a packer is used to close off spaces in the interior of the casing and tubing to insure that produced fluids flow upwardly as desired.

When a string having a not-yet-activated packer is emplaced in a wellbore to the depth of a producing formation, and particularly when such a string has a filter such as screen attached at its bottom and is washed into place, various problems are encountered because of the flow of particulate and contaminant-laden fluids past the packer. The packer is activated to insure that produced fluids flow upwardly as desired rather than, e.g., between the casing and the tubing. However, solids and other contaminants in fluids passing the packer can clog and erode its parts, including operative mechanisms which must operate when and as desired to make the packer set, seal and seat properly. A malfunctioning packer can inhibit or prevent production and it is a very expensive process to retrieve such a packer from a wellbore.

In accordance with §1.56 of 37 C.F.R. applicant is aware of the following prior art, copies of which are submitted herewith:
1. N-SITU TECHNOLOGY, Section 3, Baker Sand Control, 1984–1985 Catalog, pp. 23–50, 55–56.
2. Introduction to Oil Well Service and Workover, published by The University of Texas, p. 23, 1971.
3. Workover Well Control, by Adams, pp. 4–11.
4. Halliburton Services Sales and Service Catalog, 1970–1971, pp. 130–136.
5. Casing Hardware and Oilfield Service Tools, Dowell, 1982–1983 Composite Catalog, pp. 2520–2523.
6. U.S. Pat. Nos.: 50,967; 58,953; 83,901; 963,549; 1,974,664; 2,216,037; 2,321,318; 2,356,769; 2,513,944; 3,351,475; 3,587,740; 4,549,608; 4,550,778; 4,552,215; 4,552,216; 4,553,595.

SUMMARY OF THE INVENTION

The present invention is directed to a well screen having a central body (either solid or hollow and plugged at the ends) and an outwardly extending cup member (either solid, expansible, or inflatable) which can contact the walls of the tubular into which it is placed so that the flow of fluids up from below the screen is directed through passages in or behind the screen, and into passages through or adjacent the cup member, the cup member preventing the flow of unscreened fluids in the annulus exterior to and above the well screen.

When a device according to this invention is placed in a tubular member below a packer or other mechanism, only screened fluid is permitted to contact and flow past the packer or mechanism. Hence the packer or mechanism is not subjected to the solids, particulates, or other contaminants which are present in the unscreened fluid.

It is therefore an object of the present invention to provide a new and efficient well screen, method, and apparatus.

Another object of the present invention is the provision of a well screen which has a cup member which is solid, expansible, or inflatable which can contact the inner walls of a tubular member in which the screen is emplaced to prevent the flow of fluids between the inner walls of the tubular member and the outer walls of the screen.

Yet another object of the present invention is the provision of a method for using a well screen according to this invention.

An additional object of the present invention is the provision of such a well screen which can be used to prevent unscreened fluid from contacting or flowing past or through packers or other mechanisms present in the wellbore beyond the screen.

To one of skill in this art who has the benefit of this invention's teachings, other and further objects, advantages, and features will be clear from the following description of the presently preferred embodiments of the invention, given for the purpose of disclosure, when taken in conjunction with the accompanying drawings.

DESCRIPTION OF THE DRAWINGS

FIG. 3 is a cross-sectional view along lines 3—3 of the screen of FIG. 2.

FIG. 4 is a cross-sectional view along line 4—4 of the screen of FIG. 2.

DESCRIPTION OF THE PREFERRED EMBODIMENT

Figure 2:
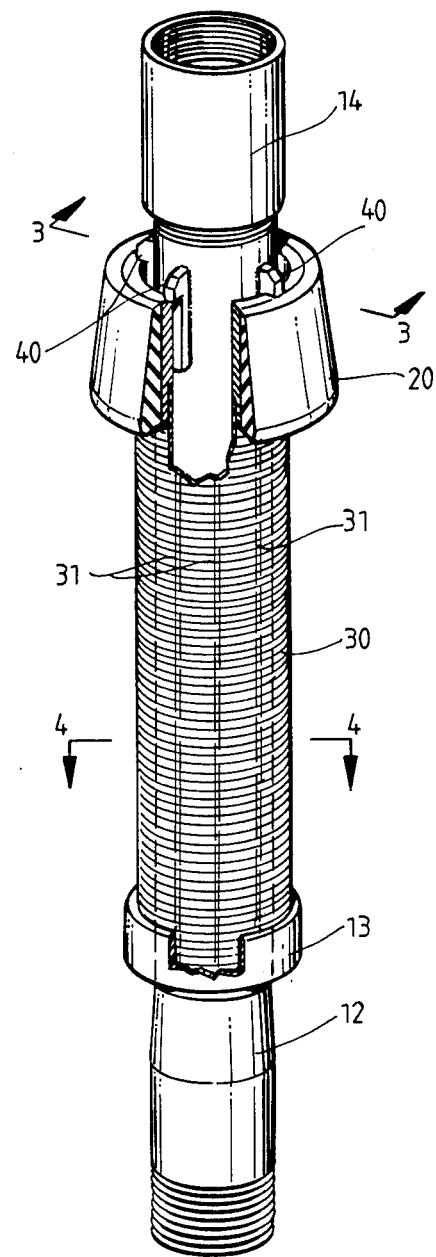
FIG. 2 is a side perspective view of a well screen according to the present invention.

The well screen 10 according to the present invention shown in FIG. 2 has the mandrel 12 to which is connected (preferably by welding) the mount 13. The spacer bars 40 are secured to the mandrel 12 and the cup 20 secured at one end to the spacer bars 40 and at the other end to the screen 30. The screen is secured in the mount 13 at one end of the well screen 10 (preferably by a press fit) and is secured to the cup 20 (preferably by welding) at the other end of the well screen 10.

The path for fluid flowing through the well screen 10 is shown in FIG. 3. Fluid flows through the screen 30 and then toward the cup 20 in the channel 60 between the screen 30 and the mandrel 12. The fluid flows from the channel 60 to the channel 62 between the cup 20 and the mandrel 12 and then around and past the spacer bars to the exterior of the well screen 10. Since the cup 20 sealingly contacts the interior wall of the casing 3, no unscreened fluid can flow beyond the well screen 10. Only the screened fluid flowing through the channels 60 and 62 flows beyond the well screen 10.

FIG. 4 illustrates a view of the apparatus of FIG. 2 taken along line 4—4. The screen 30 is reinforced by a plurality of rods 31 which are secured to the interior of the screen 30. The mandrel 12 extends through the screen 30.

Figure 1:
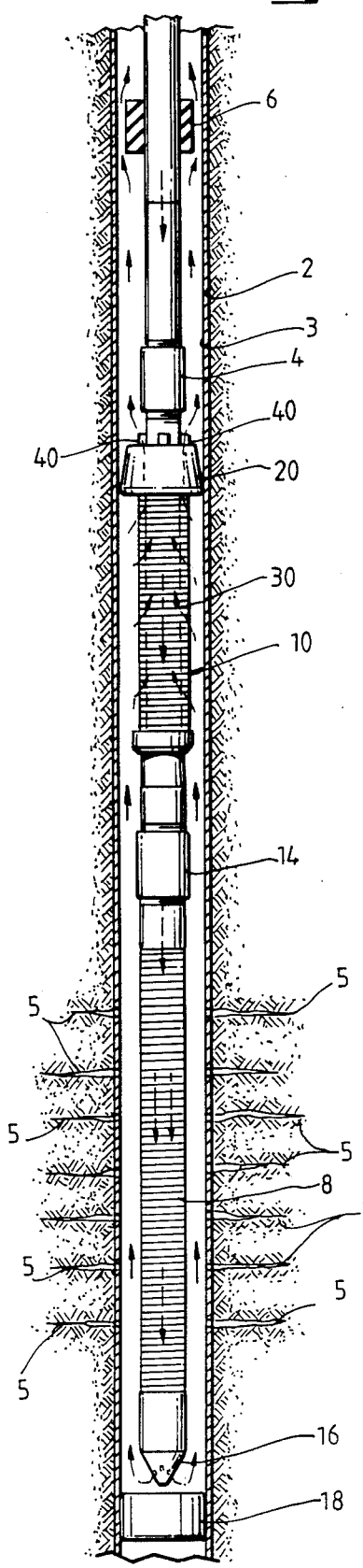
FIG. 1 is an illustrative schematic view showing a wellbore operation in which a tubing string with a screen filter at the end and a jet shoe has been introduced into the wellbore. The string includes a well screen according to the present invention and indicates by arrows the flow path of fluid through the tubing, screen filter and well screen and to and beyond a packer.

A typical emplacement of the well screen 10 in a cased wellbore is shown in FIG. 1. The tubing string 4 in the casing within the wellbore 2 has the screen filter 8 connected to the bottom of the string. The jet shoe 16 is connected to the bottom of the screen filter 8. By means of the connections 14, the well screen 10 is connected to the string 4. The cup 20 of the well screen 10 sealingly contacts the interior of the casing 3. The packer 6 has not yet been set against the interior wall of the casing 3.

Since the cup 20 seals off the flow path between the interior of the casing wall 3 and exterior of the tubing, only fluid screened by the well screen 10 can flow to and past the packer 6. Of course, any other tool or mechanism disposed above the well screen 10 between the casing and tubing well will encounter only fluid screened by the well screen 10.

For production, the packer 6 is set so that production fluid must go through the screen filter 8 and up the interior of the tubing. No unscreened production fluid can flow past the set packer 6.

What is claimed is:

1. A device for screening fluid, the device comprising tubular body means having an exterior wall, tubular screen means connected to, disposed about and encircling the tubular body means,
cup means disposed about, encircling, and extending outwardly form the tubular body means, the cup means having an interior wal adjacent the exterior wall of the tubular body means,
fluid channel means formed between the exterior wall of the tubular body means and the interior wall of the cup means, the fluid channel means communicating with the screen means for providing a path for screened fluid from the screen means to flow between the tubular body means and the cup means.

2. The device of claim 1 wherein the body means is a solid integral member.

3. The device of claim 1 wherein the device is insertable in a tubular member and the cup means extends sufficiently to sealingly contact the inner wall of the tubular member.

4. The device of claim 1 wherein a plurality of spacer bars are secured to the body means, and the cup means is secured to the spacer bars, the space between the spacer bars, cup means, and body means forming the fluid channel means.

* * * * *